Aug. 22, 1950
J. HAANTJES
FREQUENCY-MODULATED SIGNAL DISTORTION REDUCING CIRCUIT
Filed April 27, 1946
2,519,455
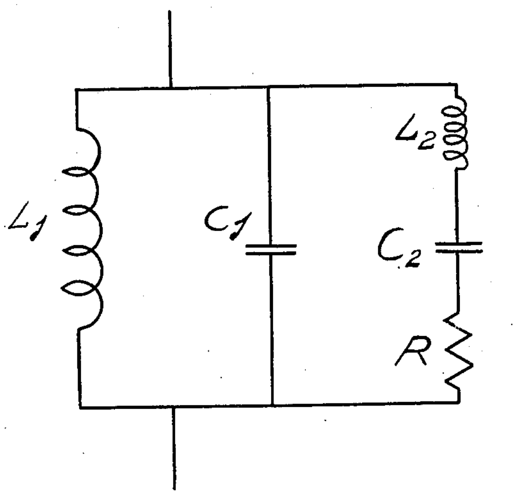
INVENTOR
JOHAN HAANTJES
BY [signature]
AGENT Patented Aug. 22, 1950

2,519,455

UNITED STATES PATENT OFFICE 2,519,455

FREQUENCY-MODULATED SIGNAL DISTORTION REDUCING CIRCUIT

Johan Haantjes, Eindhoven, Netherlands, assignor, by mesne assignments, to Hartford National Bank and Trust Company, Hartford, Conn., as trustee Application April 27, 1946, Serial No. 665,394
In the Netherlands November 13, 1942

Section 1, Public Law 690, August 8, 1946
Patent expires November 13, 1962

1 Claim. (Cl. 178—44)

In the transmission of frequency-modulated oscillations through a circuit including one or more tuned circuits, distortion occurs due to the behaviour of the resonant circuit. This distortion results from the production of spurious frequencies and more particularly third harmonics of the frequencies present in the useful spectrum. This distortion may attain an undue value if the frequency deviation does not materially exceed the highest frequency to be transmitted.

The invention provides a simple means of eliminating this distortion both in such cases and in other cases where spurious frequencies may be generated due to circuit distortion.

According to the invention, a series circuit is coupled in parallel with the resonant circuit or circuits responsible for the production of spurious frequencies. This series circuit comprises a damping resistance and a series combination of an inductance and a capacitance tuned to the frequency of the resonant circuit. The inductance $L_2$ of the series combination, the damping resistance R and the capacitance $C_1$ of the resonant circuit are so proportioned as to satisfy the relationship:

$$L_2=0.32R^2C_1$$

The accompanying drawing represents by way of example a resonant circuit which forms part of a system (not represented) for transmitting, receiving or amplifying frequency-modulated oscillations, which circuit is made as free from distortion as possible in the manner according to the invention.

The circuit comprises a coil $L_1$ with a parallel condenser $C_1$ by means of which the circuit is tuned to the central frequency $W_0$ of the system. The transmission band of the circuit is widened by means of a parallel resistance R.

In series with this damping resistance R there is connected, according to the invention, a circuit which is tuned to the central frequency $W_0$ and which consists of the inductance $L_2$ and a condenser $C_2$ in series. The relationship of the elements $L_2$—$C_1$ and R should be such that $$L_2=0.32R^2C_1$$

This equation is derived as follows:

For the impedance Z of the circuit shown in the drawing, it is easily shown that:

$$\frac{1}{Z}=\frac{1}{j\omega L_1}+\frac{1}{j\omega L_2+\frac{1}{j\omega C_2}+R}+j\omega C_1 \qquad (1)$$

wherein $\omega$ is the circuit frequency. Let $\omega_0$ be the central frequency and:

$$L_1C_1=L_2C_2=\frac{1}{\omega_0^2} \qquad (2)$$

and assume that:

$$\frac{\omega_0}{\omega}-\frac{\omega}{\omega_0}=\beta \qquad (3)$$

then inserting Equations 2 and 3 in Equation 1:

$$Z=\frac{j\omega_0\beta L_1-\omega_0^2L_1C_2R}{\beta^2-\omega_0^2L_1C_2+j\omega_0\beta C_2R} \qquad (4)$$

The phase shift $\psi$ of a complex impedance $Z=a+jb$ is given by the relation $$\psi=\text{arc tan }\frac{b}{a}$$

The phase shift $\psi$ of the impedance Z in Equation 4 has the value:

$$\psi=\text{arc tan }\left(\frac{C_2R^2-L_1}{\omega_0L_1C_2R}\beta+\frac{1}{\omega_0^3L_1C_2^2R}\beta^3\right) \qquad (5)$$

$$\beta=\frac{\omega_0}{\omega}-\frac{\omega}{\omega_0} \qquad (3)$$

$$\beta=\frac{\omega_0}{\omega_0-\Delta\omega}-\frac{\omega_0-\Delta\omega}{\omega_0}=\frac{2\omega_0-\Delta\omega^2}{\omega_0^2-\omega_0\Delta\omega} \qquad (6)$$

Assuming:

$$\omega_0\gg\Delta\omega$$

Then:

$$\beta=\frac{2\Delta\omega}{\omega_0} \qquad (7)$$

Inserting Equation 7 in Equation 5:

$$\psi=\text{arc tan }\left(2\frac{C_2R^2-L_1}{\omega_0^2L_1C_2R}\Delta\omega+8\frac{1}{\omega_0^6L_1C_2^2R}\Delta\omega^3\right) \qquad (8)$$

Developing $\psi$ in the power expansion of $\Delta\omega$ the coefficient of $\Delta\omega^3$ has the following value:

$$8\frac{1}{\omega_0^6L_1C_2^2R}-\frac{8}{3}\left(\frac{C_2R^2-L_1}{\omega_0^2L_1C_2R}\right)^3=0 \qquad (9)$$

which coefficient must be zero.

It follows:

$$L_1^3+C_2^2R^4L_2-C_2^3R^6=0 \qquad (10($$

Rearranging Equation 2

$$L_1=\frac{1}{\omega_0^2C_1} \qquad (11)$$

$$C_2=\frac{1}{\omega_0^2L_2} \qquad (12)$$

Inserting Equations 11 and 12 in Equation 10:

$$L_2^3+3C_1^2R^4L_2-C_1^3R^6=0 \qquad (13)$$

Solving Equation 13:

$$L_2 \cong 0.32R^2C_1 \qquad (14)$$

If the relation of Equation 14 is satisfied, then the third harmonic produced by circuit distortion is reduced to a negligible amount. This result is achieved even under the condition of a comparatively small frequency deviation.

What I claim is:

A frequency modulated wave transmission circuit arrangement comprising a parallel tuned oscillatory circuit having an inductive element and a capacitive element tuned to the central frequency of the wave to be transmitted, a series tuned oscillatory circuit having an inductive element and a capacitive element tuned to the frequency of the wave to be transmitted, a resistive element, a series connection of said series tuned oscillatory circuit and said resistance, a parallel connection of said series connected series tuned oscillatory circuit and said resistive element and said parallel tuned oscillatory circuit, and a relation between the said elements of the circuit arrangement satisfying the equation:

$$L_2=0.32R^2C_1$$

where:

$L_2$=inductive element of the series tuned oscillatory circuit
R=resistive element
$C_1$=capacitive element of the parallel tuned oscillatory circuit.

JOHAN HAANTJES.

REFERENCES CITED

The following references are of record in the file of this patent:

UNITED STATES PATENTS

| Number | Name | Date |
|---|---|---|
| 2,195,095 | Rinia | Mar. 26, 1940 |